(12) United States Patent
Carroll

(10) Patent No.: US 6,760,106 B2
(45) Date of Patent: Jul. 6, 2004

(54) METHOD OF AND APPARATUS FOR REGISTERING A SINGLE DIMENSIONAL IMAGE WITH A TWO DIMENSIONAL REFERENCE IMAGE

(76) Inventor: Ernest A. Carroll, 12913 Alton Sq. No. 114, Herndon, VA (US) 20170

( * ) Notice: Subject to any disclaimer, the term of this patent is extended or adjusted under 35 U.S.C. 154(b) by 407 days.

(21) Appl. No.: 09/796,365

(22) Filed: Mar. 2, 2001

(65) Prior Publication Data

US 2002/0122114 A1 Sep. 5, 2002

(51) Int. Cl.$^7$ .................................................. G01J 3/28

(52) U.S. Cl. ...................................... 356/328; 356/326

(58) Field of Search ................................. 386/328, 326

(56) References Cited

U.S. PATENT DOCUMENTS

| | | | |
|---|---|---|---|
| 3,586,434 A | * | 6/1971 | Mueller |
| 4,764,781 A | * | 8/1988 | Leib et al. |
| 5,061,063 A | * | 10/1991 | Casasent |
| 5,200,819 A | * | 4/1993 | Nudelman et al. ............ 348/65 |
| 5,327,286 A | * | 7/1994 | Sampsell et al. |
| 5,619,596 A | * | 4/1997 | Iwaki et al. |
| 6,160,910 A | * | 12/2000 | Freifeld |

FOREIGN PATENT DOCUMENTS

WO    WO 91/05360    * 4/1991

* cited by examiner

Primary Examiner—Zandra V. Smith
(74) Attorney, Agent, or Firm—David L. Banner

(57) ABSTRACT

Method of and apparatus for registering a single dimensional image to a two dimensional image, and for generating spectral two dimensional images, as practiced in aerial imagery. Raw data or primary images are acquired from a subject of interest and are passed through a camera type aperture and divided by passing the light beam through a beam splitter. One beam is recorded digitally as two dimensional images containing at least three recognizable geometric reference points. The second beam is passed through a slit to form single dimensional images, which are then preferably diffracted to produce plural spectral single dimensional images. The spectral single dimensional images are recorded digitally in a manner enabling each single dimensional image to be linked to its corresponding two dimensional reference image. The beam splitter and slit device may be replaced by a selectively reflective beam splitter which accomplishes the function of both deleted components. Spectral two dimensional images may be reconstituted from the single dimensional digital record by manipulating the data to position each single dimensional image appropriately within an array. Proper location of each single dimensional image is accomplished by positioning it according to its relation to the geometric reference points. Thus a plurality of two dimensional images, each corresponding to one band of the spectrum, can be reconstituted for each original reference image.

23 Claims, 5 Drawing Sheets

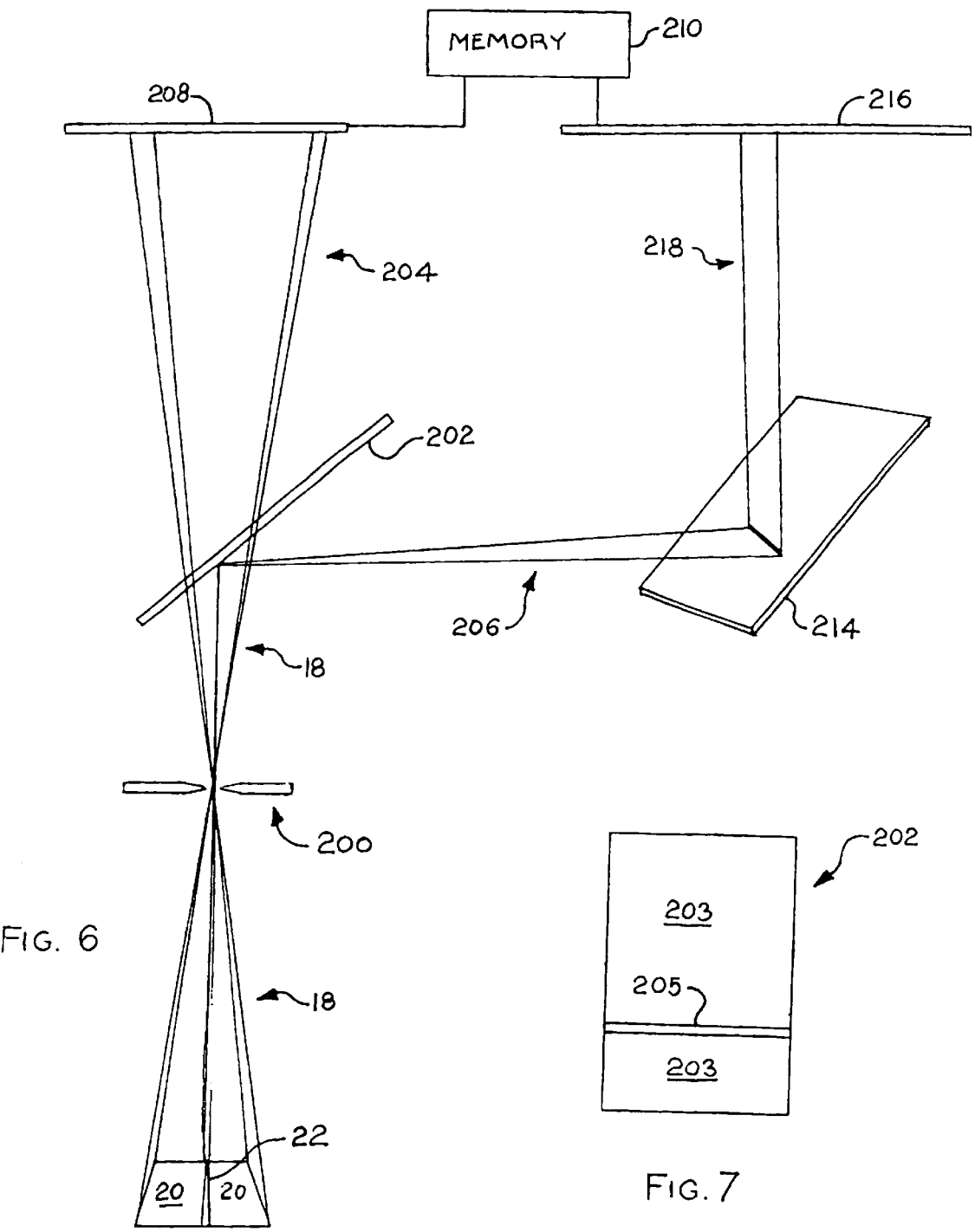

METHOD OF AND APPARATUS FOR REGISTERING A SINGLE DIMENSIONAL IMAGE WITH A TWO DIMENSIONAL REFERENCE IMAGE

BACKGROUND OF THE INVENTION

1. Field of the Invention

The present invention relates to multispectral, hyperspectral, and ultraspectral imagery, and more particularly to formation of spatially correct spectral two dimensional spectral images from stored digital single dimensional images by digital manipulation of stored data. In the preferred embodiment, single dimensional images of a selected spectral band are correlated to their respective geometric locations by referring to linked two dimensional images having a plurality of geometric reference points, and are subsequently assembled into a single, two dimensional image of the selected spectral band.

2. Description of the Prior Art

Aerial imagery provides a specialized technique of obtaining information regarding characteristics of large land masses which may be unavailable from other sources or inefficiently obtained in other ways. In some image acquisition processes, images are arranged or taken by layers of information. Such images have equivalent geographic coverage, but capture different characteristics. For example, multispectral or hyperspectral imagery includes layers of data taken at different frequency bands. Each image data layer conveys different information to the observer. In the example of forest fires, images derived only from visible portions of the spectrum may reveal only a cloudy smoke cover. However, images based on infrared bands may reveal underlying conditions including flame front lines. In agriculture, to consider a second example, health of a crop, as reflected by sparseness or thickness of foliage, may be quantified to determine where certain nutrients or water are deficient or overabundant.

Successful sequential imagery, particularly wherein bounds of one image abut bounds of surrounding images, is dependent upon appropriate attitude of the image acquiring device. Low altitude multispectral, hyperspectral, and ultraspectral imagery, that being imagery acquired from a camera or other image gathering apparatus carried aboard an air breathing aircraft, is especially subject to various problems which may arise from attitude of the aircraft. A notorious obstacle to taking sequential single dimensional or line images from aircraft is variation in any of pitch, roll, and yaw of the aircraft due to air currents, internal vibration, and other causes. As pitch, roll, and yaw vary, each succeeding imaging location varies from a desired constant orientation, such as directly below the aircraft. Consequently, captured images may not be sufficiently aligned with previously captured images as to display sufficient continuity of the subject to render useful information. In "push broom" multispectral, hyperspectral, and ultraspectral scanning, the location of images varies from the usual focal point directly below the aircraft with aircraft movement.

In aerial photography, a frequent answer has been to stabilize a camera within the aircraft with respect to the ground so that the camera maintains vertical orientation despite variations in pitch, roll, and yaw. This approach has been satisfactory when the aircraft is fairly large. That is to say, conventional manned aircraft usually have sufficient space, strength, and power to accommodate stabilizing apparatus. U.S. Pat. No. 4,764,781, issued to Kenneth G. Leib et al. on Aug. 16, 1988, exemplifies camera stabilization.

However, stabilizing apparatus precludes the use of miniature aircraft, where "miniature" encompasses aircraft too small to accommodate a human pilot. In some situations, only miniature aircraft may be practical to use. Even where larger aircraft are employed, it may be preferable to conserve space, weight, and expense, among other resources. A need exists for much smaller apparatus that will solve the problem of image alignment.

Capture of images in digital form and manipulation of digital data may be exploited to render stabilizing apparatus unnecessary. Digital apparatus is sufficiently small as to reduce requirements for space, weight, complexity and reliability, and expense in aerial imagery acquisition. Correlation techniques applicable to digitized images are known. However, many correlation techniques are not susceptible to single dimensional images typical of images acquired by "push broom" hyperspectral scanners because it is necessary to have a minimum of three non-collinear points to establish reference data from two dimensional images. No satisfactory way to manipulate single dimensional images exists to establish accurate location in two dimensions.

One approach is to generate several images simultaneously from a common source. This approach is employed in holography and other optical disciplines. U.S. Pat. No. 3,586,434, issued to Peter F. Mueller on Jun. 22, 1971, shows use of a beam splitter in multispectral image storage.

U.S. Pat. No. 5,619,596, issued to Tadao Iwaki et al. on Apr. 8, 1997 shows a correlation technique that overcomes motion of an input image.

U.S. Pat. No. 5,327,286, issued to Jeffrey B. Sampsell et al. on Jul. 5, 1994, describes an optical correlation system employing a beam splitter to derive two images, and a microprocessor to process corresponding data.

U.S. Pat. No. 5,061,063, issued to David P. Casasent on Oct. 29, 1991, presents a technique wherein a single dimension image is compared to a two dimensional image.

U.S. Pat. No. 6,160,910, issued to Daniel Freifeld on Dec. 12, 2000, shows an optical system for providing images of sufficient quality to derive accurate measurements from the same.

The prior art fails to show a system wherein a single dimensional image and a two dimensional image are generated simultaneously from a single optical input, are digitized, and wherein a two dimensional image is reconstituted from a digital record of many single dimensional images, using geometric reference points taken from the two dimensional image to establish correct location of each single dimensional image within the reconstituted image.

None of the above inventions and patents, taken either singly or in combination, is seen to describe the instant invention as claimed.

SUMMARY OF THE INVENTION

The present invention sets forth novel apparatus for and method of registering a single dimensional image or simultaneously collected series of spectrally unique single dimensional images to a two dimensional image, and of generating two dimensional images, preferably of a selected spectral band, from stored digital single dimensional images by digital manipulation of stored data. Single dimensional images of a selected spectral band are correlated to their respective geographic locations by referring to linked two dimensional images having a plurality of geographic reference points, and are assembled into a single, two dimensional image of the selected spectral band.

The foregoing is accomplished by processing optical images to generate two images simultaneously. A light beam conveying a desired image, which will be termed a primary image, is split into two images. One of these two images is passed through a slit to generate a single dimensional image, and preferably is also divided into spectral bands, which process yields a number of single dimensional images differing only in their spectral bands. The other image, which will be termed a reference image, is retained in two dimensional format, and includes a plurality of at least three recognizable geographic reference points. All images, wherein each primary image yields one reference image and potentially many single dimensional images or line scans each of one spectral band, are stored digitally, and are digitally linked to one another. This process is repeated for each sequential primary image.

A two dimensional image of a selected spectral band is subsequently reconstituted from the many single dimensional images which have been digitally stored. Each single dimensional image or line is placed digitally in an array corresponding to the primary image. Each line is correctly located by referring to its linked reference image. The reference image includes at least three recognizable geometric reference points. Because location of each line scan can be related to reference points also employed for other line scans taken from other primary images, it follows that all line scans can be appropriately arrayed within a reconstituted spectral two dimensional image by relating each constituent line scan to a common set of reference points. This is done by applying appropriate well known mathematical manipulation techniques to both the reference images and to each line scan.

A principal application of the invention is that of aerial photography. Heavy, complex, bulky, expensive stabilization equipment can be eliminated in favor of lighter, less complicated, compact, less expensive optical and digital equipment. In aerial photography, it is contemplated that the present invention can in many applications so reduce imagery apparatus in dimensions and weight that miniature, unmanned aircraft can be employed in place of large, manned aircraft. This has obvious implications relating to safety of personnel both on the aircraft and also on the ground.

Although description of the invention is primarily couched in terms of low altitude aerial photography, it must be recognized that the novel principles apply to other forms of image acquisition. For example, satellite imagery and other high altitude aerial imagery, underwater imagery, robotic and other imagery conducted by machines, and micro-imagery, to name only a few possible other fields of imagery, may also utilize the invention. The present invention applies to all fields wherein single dimensional images or line scans are obtained from two dimensional primary image acquisition, are stored, and are subsequently reconstituted by registering each line scan with a linked two dimensional image containing at least three geometric points of reference.

Elements of apparatus for carrying out the invention include a camera type aperture, a beam splitter, a first digital recorder for recording two dimensional reference images, a beam restrictor such as a slit disposed to intercept the second beam, for generating single dimensional images or line scans, an optional diffractor for generating multispectral single dimensional images, and a second digital recorder for recording the second images. The two digital recorders are, of course, operably linked to memory devices. Desired images may be subsequently reconstituted from the stored records by a suitable computer or comparable digital processor into which the digital record has been entered, using known mathematical techniques to manipulate the data.

In summary, the invention provides a way of generating two dimensional images from line scans preferably taken sequentially from a mobile platform passing over an area of interest. Conventional stabilization apparatus for cameras and other image acquisition apparatus is eliminated in favor of data manipulation wherein a reference image is correlated with a subject image in a manner eliminating problems of parallax. The images are stored in manipulatable and retrievable digital form.

Accordingly, it is one object of the invention to register a single dimensional image to a two dimensional reference image by digital manipulation.

Another object of the invention is to generate two dimensional images from line scans taken sequentially from a mobile platform passing over an area of interest in a manner overcoming shortcomings of the prior art relating to stabilization of image acquisition apparatus.

Still another object of the invention to reduce bulk, complexity, weight, and cost of apparatus the function of which is to assure that subject images can be accurately correlated to reference images in a manner eliminating problems such as parallax.

It is a further object of the invention to record single dimensional subject images and two dimensional reference images, and to reconstitute two dimensional subject images digitally from the recorded images.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 6 is a diagrammatic representation of apparatus of an alternative embodiment of the invention.

FIG. 7 is a plan detail view of a component seen at the left center of FIG. 6.

DETAILED DESCRIPTION OF THE PREFERRED EMBODIMENTS

Figure 2:
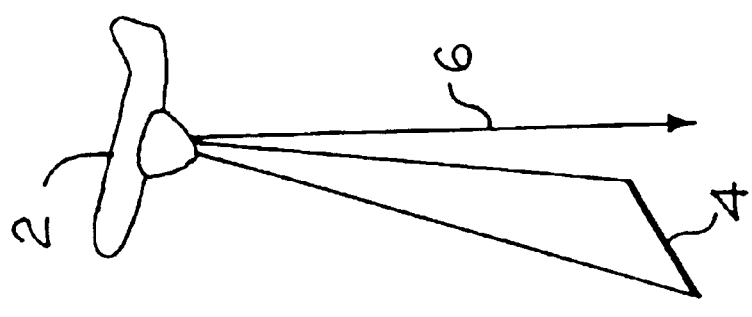
FIG. 2 is similar to FIG. 1, but illustrates a hazard which can disrupt prior art aerial image acquisition.
Figure 1:
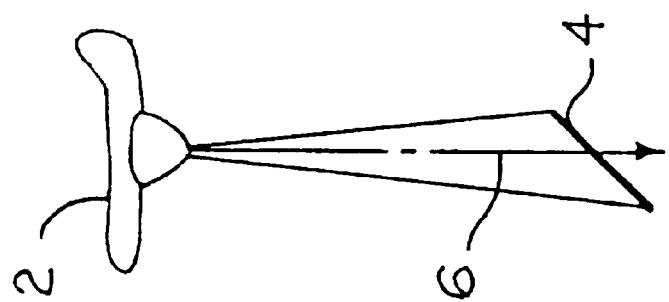
FIG. 1 is a diagrammatic, side perspective view of prior art aerial image acquisition apparatus.

FIG. 1 of the drawings illustrates prior art aerial image acquisition under ideal conditions, wherein an aircraft 2 engaged in "push broom" line scanning is oriented such that single dimensional spatial images, or line scans 4 are taken from directly below aircraft 2, as indicated by vertical projection line 6. FIG. 2 illustrates a frequent disrupting influence to prior art aerial photography, namely, that aircraft 2 is undergoing a variation in pitch. It will be seen that when a camera (not separately shown) fixed in position on aircraft 2 (in this example, aircraft 2 lacks stabilization apparatus for the camera) focusses on a portion of the subject of interest, which portion is out of alignment with vertical projection line 6, a resultant image is displaced from a sequence of images being captured. The term "subject of interest" refers to surface areas of the earth or other objects from which images are taken.

Figure 3:
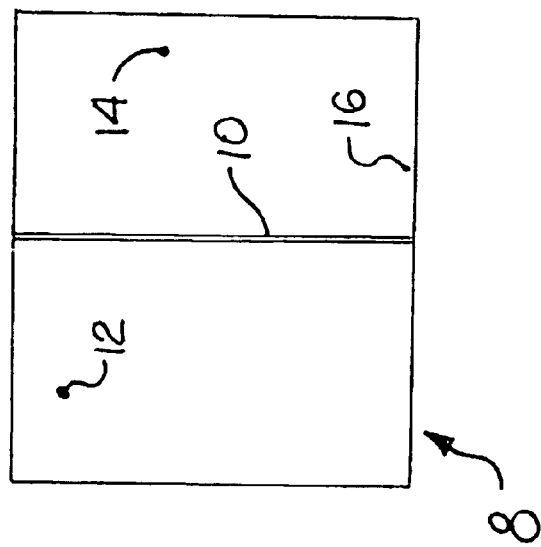
FIG. 3 is a plan representation of a disoriented prior art aerial image.

FIG. 3 represents a two dimensional image 8 of the area of interest and a single dimensional image 10, which corresponds to line scan 4, taken under the conditions of FIG. 2. Despite the presence of three recognizable geographic points of reference 12, 14, 16, the image represented in FIG. 3 is not highly useful. This is because parallax problems arising from the variation in pitch, as illustrated in FIG. 2, introduce distortions into the image acquisition process which under prior art conditions disrupt ability to properly align image 10 with other corresponding images (not shown) taken sequentially previously and subsequently. The present invention addresses this deficiency.

Conventional prior art practice is to provide aircraft 2 with stabilizing apparatus for assuring that the camera be oriented as illustrated in FIG. 1 despite variations in pitch, roll, or yaw, the former being illustrated in FIG. 2. The present invention renders stabilization apparatus unnecessary, being able to accommodate variations in pitch, roll, and yaw and other displacements of a mobile platform by digital manipulation, as will be further explained hereinafter.

Figures 4, 8:
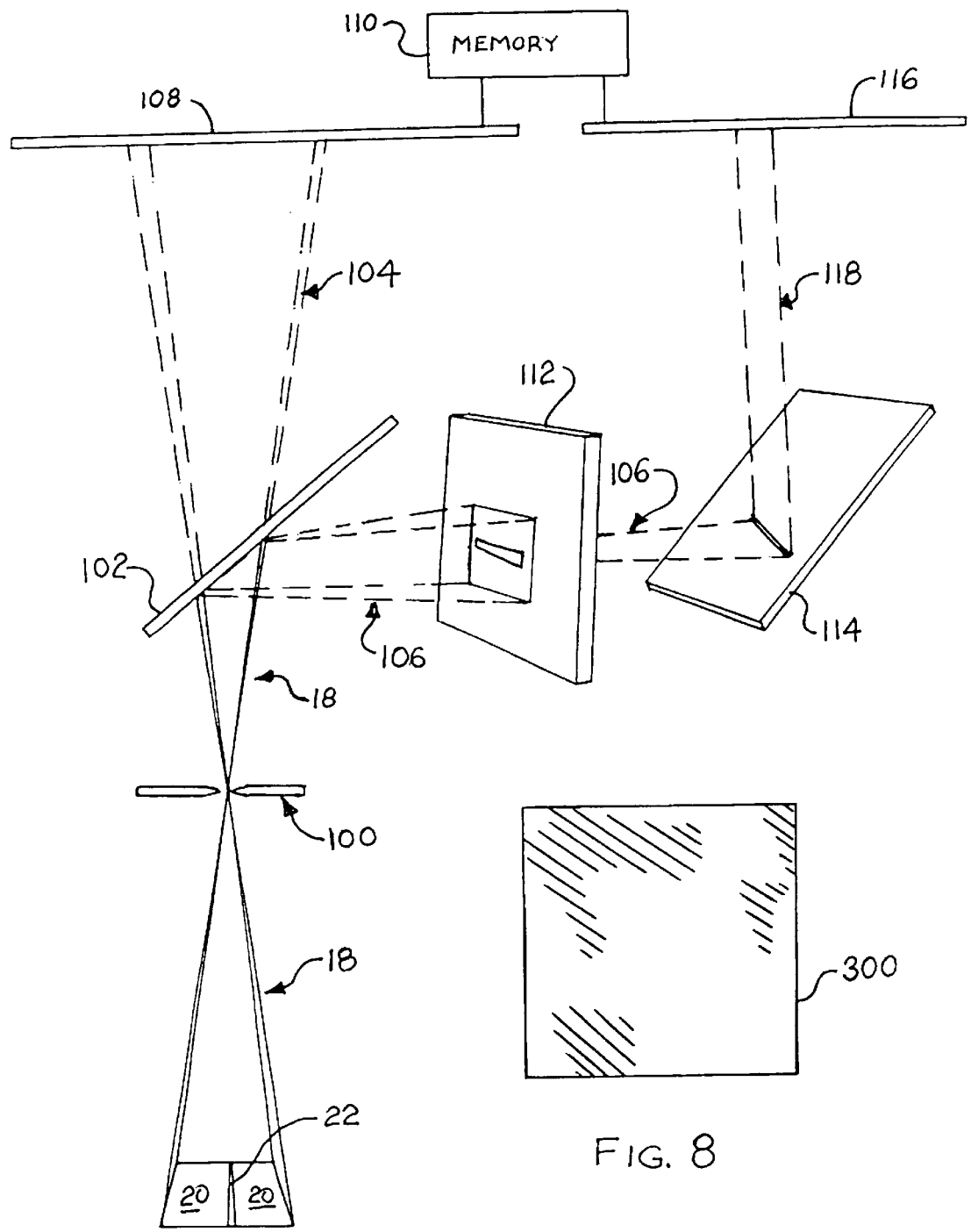
FIG. 4 is a diagrammatic representation of apparatus of one embodiment of the present invention.
FIG. 8 is a diagrammatic representation of a two dimensional image formed according to the present invention.

FIG. 4 illustrates one embodiment of apparatus for carrying out the invention. The apparatus shown in FIG. 4 provides a digital data source for generating two dimensional images from single dimensional images of a subject of interest. The invention preferably but not necessarily applies to image acquisition methods wherein single dimensional images are taken sequentially with respect to space and time from a mobile platform such as aircraft. The apparatus includes a focussing device 100 which focusses incoming light beams represented collectively as 18 emanating from a subject of interest. Focussing device 100 may utilize refraction, reflection, holographic optics, or other ways to focus light beams, and therefore may comprise lenses and other devices in place of the aperture device depicted herein. 20 represents that portion of the subject of interest which yields light beam 18. The subject of interest could easily be of much greater area than that of portion 20. Line scan 22 represents that portion of the subject of interest which will result in a captured single dimensional image (see FIG. 5).

Focussing device 100 focusses light in the manner of conventional cameras (not shown). After focussing and undergoing conventional inversion in focussing device 100, light beam 18 strikes a beam splitter 102 which is disposed in series with focussing device 100 and with light beam 18. Beam splitter 102 divides optical energy of beam 18 to form a reference light beam 104 and a subject light beam 106. Reference light beam 104 is so named because images derived therefrom will subsequently be utilized as reference resources in data manipulation to be described hereinafter. Reference light beam 104 impinges upon a first digital image recorder 108 disposed in image capture relation to beam 104, and records two dimensional reference images therefrom. Digital image recorder 108 converts optical energy into digital data, and is communicably connected to a digital memory apparatus 110 which stores the data in digital form.

Beam splitter 102 of FIG. 4 is of a type which divides optical energy of incoming light beam 18 such that the area of coverage of associated reference light beam 104 includes the entirety of the coverage area of the subject of interest, or portion 20. Reference light beam 104 accounts for less than all of the available optical energy of incoming light beam 18 which emanates from portion 20 because a fraction of that optical energy is diverted to form subject light beam 106. Correspondingly, the area of coverage of subject light beam 106 includes the entirety of portion 20 of the subject of interest, and accounts for less than all of the available optical energy of incoming light beam 18. As an example, beam splitter 102 may pass eighty percent of the available optical energy of light beam 18 to digital image recorder 108, while diverting the remaining twenty percent of the available optical energy of light beam 18 towards slit device 112. As employed herein, available optical energy encompasses all of the optical energy of light beam 18 less that which is incidentally and unintendedly lost due to internal reflection, refraction, and other sources of loss. In summary, images derived from both reference beam 104 and subject beam 106 show the entirety of portion 20 of the subject of interest which yields light beam 18, albeit each at energy levels reduced from those of light beam 18.

Subject light beam 106 is directed to a slit device 112 which is disposed in series with subject light beam 106. Slit device 112 generates single dimensional subject images from light beam 106. Now reduced in area by the slit of slit device 112, light beam 106 strikes a diffractor 114 which is disposed in series with subject light beam 106, being located between slit device 112 and a second digital image recorder 116. Diffractor 114 diffracts light beam 106 into plural subject beams (indicated collectively as 118) each of one spectral band. Digital image recorder 116 is disposed in image capture relation to subject light beam 118 and hence captures subject images (see FIG. 5) from light beam 118. Digital image recorder 116 is communicably connected to memory apparatus 110.

Figure 5:
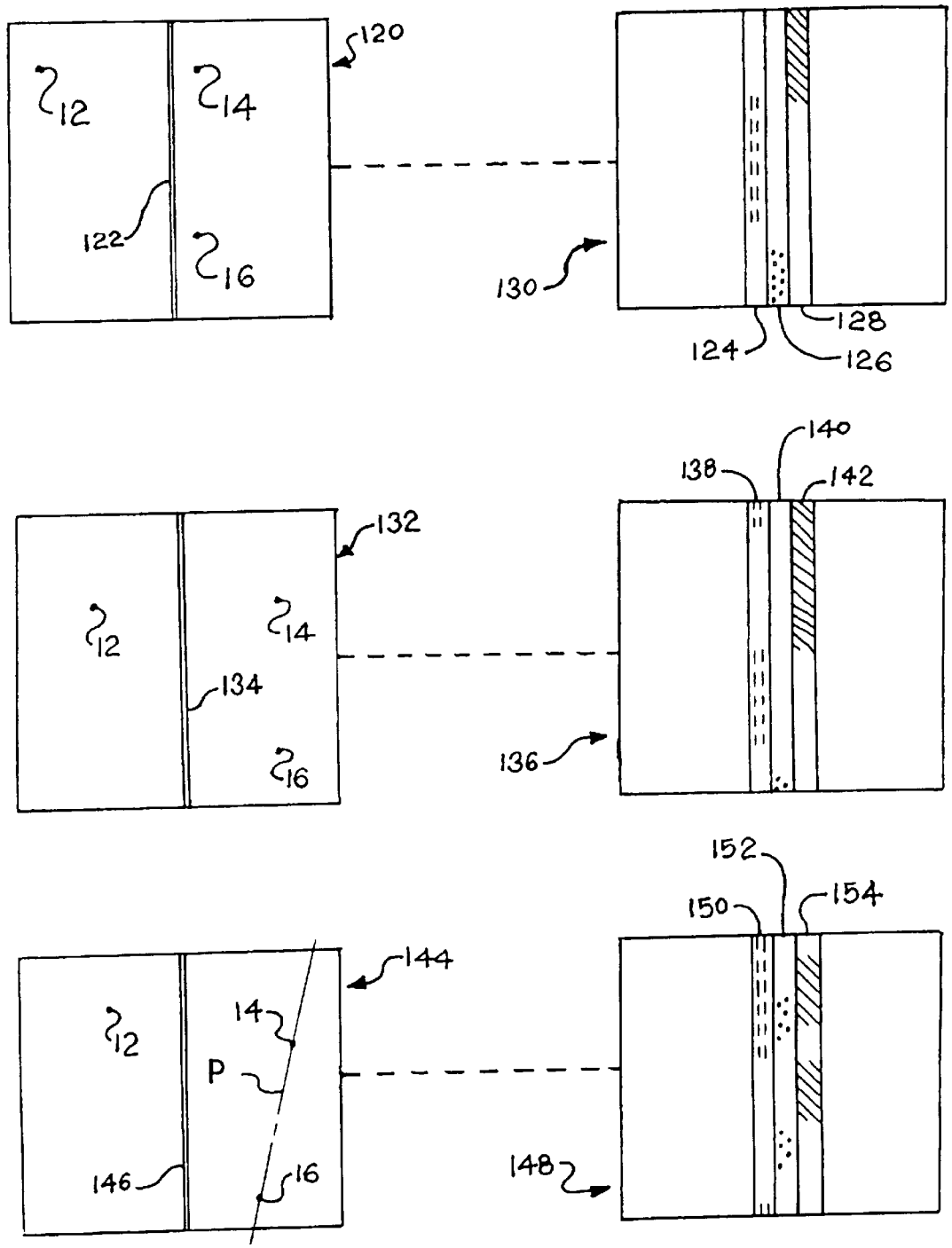
FIG. 5 is a diagrammatic representation of two dimensional reference images and their associated single dimensional images, both pertaining to the present invention.

FIG. 5 illustrates representations of three images which are captured by the novel apparatus. A two dimensional reference image 120 is obtained from reference light beam 104. Area 122 represents the area of a single dimensional image which is the subject image, or that portion of reference image 120 which is actually desired. Light beam 118 (see FIG. 4) comprises a series of single dimensional images corresponding to the area of coverage designated 122. Three representative single dimensional images 124, 126, 128 are shown as part of a composite image 130 including single dimensional images for all captured spectral bands. Although only three images 124, 126, 128 are illustrated, two hundred fifty-six corresponding images are routinely captured in conventional multispectral imagery. The number of images may easily number up to one thousand twenty-four, and may be greater if desired.

Reference image 120 is recorded by digital image recorder 108 (see FIG. 4) and corresponding composite image 130 is recorded by digital image recorder 116 (see FIG. 4) simultaneously. Images 120 and 130 correspond in that both utilize incoming light beam 18 (see FIG. 4) as a common source at the same moment in time. Image 120 provides reference for determining precise location of any of the many single dimensional images which are part of composite image 130, as represented by images 124, 126, 128, which have been recorded simultaneously with reference image 120. This determination can be made subsequently by applying known mathematical photogrametric techniques to manipulation of the digital records of images 120 and 130, wherein location of image 130 is subsequently registered to image 120 by considering geometric points of reference 12, 14, 16 contained in image 120.

A critical feature of the invention is that because images 120 and 130 are obtained simultaneously and from the same geographic coverage, location of component single dimensional images of image 130 is accurately reflected when considering points of reference 12, 14, 16. Problems relating to parallax and other distorting influences are eliminated. Images 120 and 130 are linked as being corresponding reference image and subject image when establishing the digital record. This linking, as applied to the three sets of corresponding reference and subject images in FIG. 5, is represented by broken lines.

Two dimensional reference image 132 is an image acquired subsequently to acquiring image 120. The area of coverage from which single dimensional images will be developed is indicated as 134. It will be seen that points of reference 12, 14, 16 are present in image 132, but have moved relative to their locations within image 120. This is a consequence of motion or progress of a mobile platform such as an aircraft (not shown) bearing the novel apparatus. A second composite single dimensional image 136 having component spectral band images 138, 140, 142 is acquired simultaneously with and corresponds to image 132. Spectral band image 138 corresponds to spectral band image 124 associated with image 120. However, spectral band image 138 is displaced in distance from corresponding spectral band image 124 to a degree similar to that by which image 120 is displaced from image 132. Consonant with this, it may be seen that the hypothetical spectral pattern shown in image 130 has been displaced in the representation of composite image 136.

Reference image 144 represents an image acquired subsequently to image 132. Points of reference 12, 14, 16 are present in image 144, but are no longer oriented along the azimuth characterizing their orientation in images 120 and 132. Whereas points of reference 14 and 16 are vertically oriented in images 120 and 132, they are at an inclination to the vertical in image 144, as reflected by projection line P. This represents a variation in pitch condition of the mobile platform compared to that prevailing when images 120 and 132 were acquired, and could for example be similar to the situation depicted in FIG. 2. Of course, variation in pitch represents variations in yaw, roll and other characteristics affecting attitude of image acquisition apparatus. Reference image 144 has an area of coverage 146 of single dimensional images corresponding to areas of coverage 122 and 134 of previously acquired reference images 120, 132, and a linked composite image 148. Composite image 148 contains spectral band images 150, 152, 154 corresponding to composite image 130 and to respective spectral band images 138, 140, 142 of composite image 136.

There is no difficulty in correctly positioning spectral band images 150, 152, and 154 in a reconstituted two dimensional image (not shown) which may be produced by the invention. Positioning images 150, 152, 154 is rendered facile due to lack of parallax and other distortions in reference image 144 relative to images 150, 152, 154. This is in contrast to the prior art situation depicted in FIG. 3, wherein any potential reference image is distorted by parallax relative to a subject image. Thus the inventive apparatus and related method succeed in the absence of stabilizing apparatus where the prior art fails.

FIG. 6 shows an alternative embodiment of the invention wherein beam splitter 102 of FIG. 4 is replaced by a different type of beam splitter. The embodiment of FIG. 6 includes a focussing device 200, a first digital image recorder 208, a diffractor 214, a second digital image recorder 216, and a memory apparatus 210 all of which are structurally and functionally similar to their counterparts of the embodiment of FIG. 4.

Beam splitter 202 of the embodiment of FIG. 6 differs from beam splitter 102 of FIG. 4 in the following way, and combines the function of slit device 112 with that of dividing incoming light beam 18. Referring momentarily to FIG. 7, beam splitter 202 is seen to comprise a light transmissive base 203 and a non-transmissive, reflective strip 205. As employed herein, transmissive signifies that light energy passes through base 203 and does not penetrate or pass through strip 205. Light energy impinging upon reflective strip 205 from incoming beam 18 is entirely reflected from the surface of reflective strip 205. Strip 205 is dimensioned and configured to duplicate the effective area of the slit of slit device 112 of FIG. 4, wherein an area of beam 18 equivalent to that of beam 106 of FIG. 4 which is diverted towards diffractor 114.

Returning now to FIG. 6, beam splitter 202 divides optical energy of incoming light beam 18 such that the area of coverage of reference light beam 204 excludes the area of coverage of subject light beam 206. Reference light beam 204 accounts for all of the available optical energy from its area of coverage, and accounts for none of the available optical energy from the area of coverage of subject light beam 206. Conversely, the area of coverage of subject light beam 206 excludes the area of coverage of reference light beam 204, and accounts for all of the available optical energy from the area of coverage of subject light beam. The area of coverage of subject light beam 206 accounts for none of the available optical energy from the area of coverage of reference light beam 204. In summary, the reference image (not shown) obtained from light beam 204 lacks line scan portion 22 of the portion 20 of the subject of interest which yields light beam 18. Both reference light beam 204 and subject light beam 206 are of energy intensity equivalent to that of incoming light beam 18, and are complementary in their coverage of the subject.

It will be appreciated that slit device 112 of FIG. 4 and beam splitter 202 of FIG. 6 both act in the capacity of a beam restrictor which restricts the subject light beam 106 or 206 to a single dimensional configuration for the purpose of generating a single dimensional subject image. An advantage of beam splitter 202 of FIG. 6 is that all of the optical energy from beam 18, except that corresponding to strip 205, which is reflected towards diffractor 214, strikes digital image recorder 208. A disadvantage of the arrangement of FIG. 6 is that potential fringe effects such as refraction and interference will distort the image at that portion corresponding to strip 205. Also, another disadvantage is a line of data corresponding to strip 205 is lost from the reference image obtained from reference light beam 204, although compensation for this can be made. For example, data from the multispectral image may be used in a post processing technique to develop an image corresponding to that of strip 205. Therefore, selection between the embodiments of FIGS. 4 and 6 will be made with a particular application in mind.

The novel apparatus may employ conventional components. Illustratively, focussing devices 100, 200 may be similar to those of ordinary chemical film and digital cameras. Digital image recorders 108, 218, 116, 216 may be provided, for example, by any known type of apparatus for recording a digital record, such as digital detector arrays. Alternatively, a film camera (not shown) may be used in place of a digital image recorder. Likewise, memory apparatus 110 or 210 may comprise for example a microprocessor or any suitable data processing device or memory device. Diffractor 114 or 214 may be for example, a grating, a prism, or any other device which diffracts beam 106 or 206 into spectral components.

The invention may be considered as a method of registering a single dimensional image with a two dimensional reference image. The method comprises the following steps, with reference made to the apparatus set forth above. A first step is that of splitting optical energy of a light beam 18 emanating from a subject of interest into a reference light beam 104 or 204 for generating a reference image having thereon at least three recognizable geometric reference points 12, 14, 16 contained within the area of coverage of the reference image, and a subject light beam 106 or 206. A subsequent step is that of recording a two dimensional reference image obtained from reference light beam 104 or 204 in a digital data memory device 110 or 210. Next is the step of restricting the subject light beam 106 or 206 to single dimensional configuration for generating at least one single dimensional subject image. Next is the step of recording the at least one single dimensional subject image in digital data memory device 110 or 210 in a manner such that location of the subject image is linked to geometric reference points 12, 14, 16 included in the reference image.

The above method is preferably modified by adding the steps of diffracting subject light beam 106 or 206 prior to recording the single dimensional subject image, and generating a plurality of single dimensional images each of one spectral band. In the modified method, the step of recording the at least one single dimensional subject image in the digital data memory device comprises the further step of recording the plurality of single dimensional images.

The method set forth above may be expanded in its scope to comprise a method of obtaining a data source for generating two dimensional images of a subject of interest from line scan images taken sequentially from a mobile platform such as an aircraft. The expanded method includes a step of focussing incoming light beams 18 emanating from the subject of interest as a succession of primary images taken at periodic intervals of time and taken from successively adjacent portions of the subject of interest. Next is a step of dividing optical energy of each incoming light beam 18, thereby forming a reference light beam 104 or 204 for each primary image, wherein the primary image has thereon at least three recognizable geometric reference points 12, 14, 16 contained within the area of coverage of the primary image, and a subject light beam 106 or 206 for each primary image. This is followed by a step of recording a two dimensional reference image obtained from reference light beam 104 or 204 corresponding to each primary image in a digital data memory device 110 or 210.

Next is a step of restricting each subject light beam 106 or 206 to a single dimensional configuration for generating at least one single dimensional subject image from each primary image, wherein each single dimensional subject image corresponds in area of coverage to that of one associated reference image.

The next step is that of recording each single dimensional subject image in digital data memory device 110 or 210 in a manner such that each subject image is linked to one reference image.

It is preferred to modify the method to include a further step of diffracting the subject light beam 106 or 206 into multispectral images after performing the step of restricting each subject light beam, and prior to performing the step of recording each single dimensional subject image.

Some of the above methods may be expanded in scope to encompass generating reconstituted images from memory. This expansion in scope includes a step of manipulating data corresponding to the subject images to position the single dimensional subject images within an array wherein each single dimensional subject image abuts at least one other single dimensional subject image, and is positioned within the array according to its corresponding location relative to the geometric reference points of the reference image. A further step is added, that of generating integrated data corresponding to a reconstituted two dimensional subject image from the array. The reconstituted image is that which usually proves useful in hyperspectral imagery, and thus is the ultimate goal of the imagery process.

FIG. 8 shows a diagrammatic representative image 300 reconstituted from the digital record of spectral, single dimensional images. Image 300 is a two dimensional image corresponding in area to that of the primary image used to form its corresponding reference image, which could be for example any of images 120, 132, or 144 (see FIG. 5). Image 300 depicts those portions of the primary image which display the spectral band corresponding to spectral band images 128, 142, and 154 of FIG. 5 as hatched lines, and ignores all other spectral bands. Image 300 may be formed by utilizing the apparatus of FIG. 4 and 5, and by utilizing the method set forth above of obtaining a data source for generating two dimensional images of a subject of interest from line scan images taken sequentially, and its variations.

Figure 9:
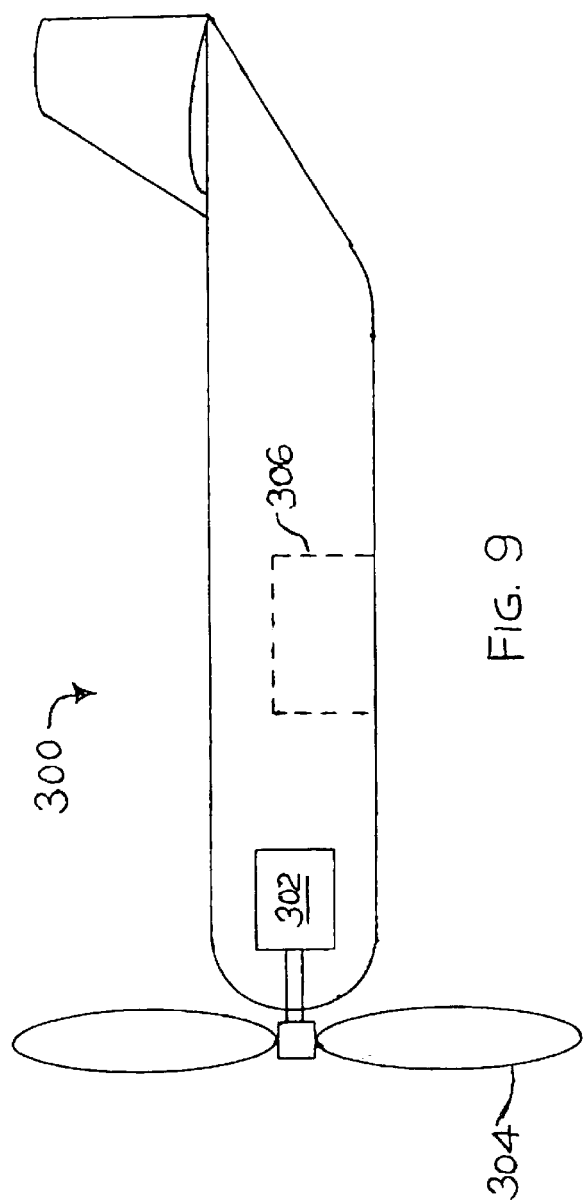
FIG. 9 is a diagrammatic representation of an alternative embodiment of the invention wherein the novel apparatus is carried aboard a miniature aircraft.

The novel method and apparatus are most advantageously employed in aerial and other dynamic image acquisition. Referring now to FIG. 9, there is shown a mobile platform such as miniature or model aircraft 300. Aircraft 300 has a suitable source of propulsive power such as a single cylinder engine 302 of well known type arranged to drive a propeller 304, and any suitable apparatus (not shown) for controlling the flight of aircraft 300. The apparatus for controlling flight may be of the well known remote control type, or alternatively could be a programmable controller of the type carried aboard aircraft 300. Image capture apparatus 306 which comprises at a minimum a focussing device of a type described herein, and which preferably comprises the apparatus of FIG. 4 or FIG. 6. Apparatus 306 is secured to the frame or fuselage (not separately shown) of aircraft 300 such that apparatus 306 is held in image capture relation to the subject of interest, which is earth surface areas (not shown) below aircraft 300. Engine 302 and propeller 304 propel aircraft 300 along and above the subject of interest in well known manner for conducting aerial imagery acquisition, and is essentially as shown in FIG. 1.

Figure 10:
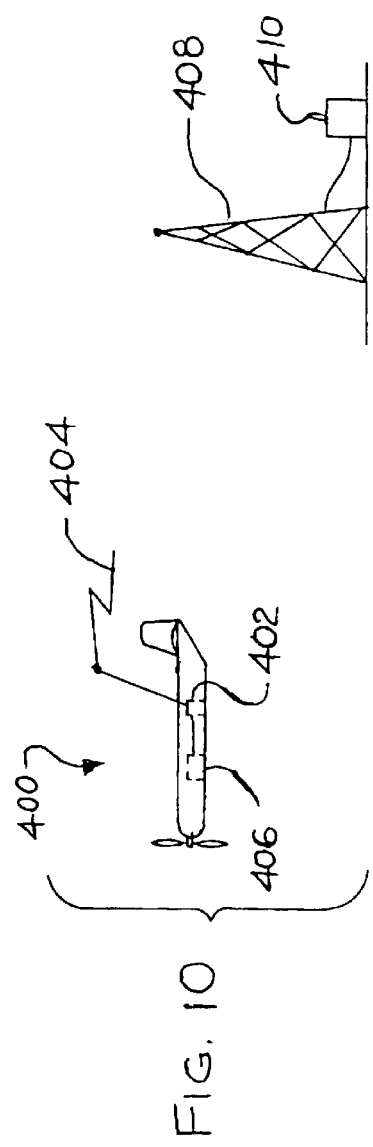
FIG. 10 is a diagrammatic representation of an alternative embodiment of the invention wherein a miniature aircraft incorporates a data link to a ground station.

It would be possible to remove a memory device such as 110 or 210 from the mobile platform, and instead to relocate the memory device remotely. This embodiment is shown in FIG. 10, wherein aircraft 400, which is in other respects equivalent to aircraft 300 of FIG. 9, has a radio transmitter 402 communicably connected to image capture apparatus 406. Digitized data is transmitted, as indicated diagrammatically at 404, to a remote radio receiver 408. Radio receiver 408 is communicably connected to a suitable digital memory apparatus 410. It will be understood that apparatus 410 functions in a manner similar to apparatus 110 of FIG. 4 and 210 of FIG. 6, and may further incorporate a monitor, printer, or other output device (none shown) for manipulating, presenting, and communicating data derived by the data link linking image capture apparatus 406 to digital memory apparatus 410.

The present invention is susceptible to variations and modifications which may be introduced thereto without departing from the inventive concept. For example, elements called for in the singular may be replaced by plural elements to similar effect. Also, elements called for in the plural could be replaced by singular elements, where function is not impaired thereby. Some examples of variations and substitutions are as follows.

It would be possible to use only one digital image recorder by directly intercepting one of the reference image beams 104 or 204 with the digital image recorder, as described herein, and reflecting a subject image beam 106, 118, 206, or 218 onto the digital image recorder. Of course, it would be possible to reverse which beam is intercepted and which is reflected. Alternatively, both beams may be reflected onto a common digital recorder.

In another example, the memory device may comprise two separate memory devices. Another example is potential modification of the apparatus of the invention to include two separate, coordinated digital cameras the functions of which duplicate the functions of the invention as described herein.

It would also be possible to locate some components of the apparatus remotely from others, as seen in the embodiment wherein a data link is used.

It would also be possible to modify the embodiment of FIGS. 6 and 7 such that strip 205 were partially reflective and partially transmissive in accordance with alternative methods and materials of construction. This would also increase coverage of the reference image.

Digital image recorders could be replaced by an analog film recorder.

It is to be understood that the present invention is not limited to the embodiments described above, but encompasses any and all embodiments within the scope of the following claims.

What is claims is:

1. Apparatus for providing a digital data source for generating two dimensional images from a plurality of sequential single dimensional images of a subject of interest, comprising:
    a focusing device disposed to focus incoming light beams emanating from a subject of interest;
    a beam splitter disposed in series with focused incoming light beams to divide optical energy of the incoming light beams to form a reference light beam and a subject light beam;
    a first digital image recorder disposed in image capture relation with said reference light beam to record a two dimensional reference image therefrom,
    a beam restrictor disposed to modify said subject light beam to generate a plurality of single dimensional subject images from said subject light beam; and
    a second digital image recorder disposed in image capture relation to said plurality of single dimensional subject images.

2. The apparatus according to claim 1, further comprising a diffractor disposed in series with said subject light beam, wherein said diffractor is disposed to diffract said subject light beam into plural subject light beams each of one spectral band, and wherein said plurality of single dimensional images comprise sets of single dimensional images grouped according to from which of said plural subject beams each of said plurality of single dimensional images is formed.

3. The apparatus according to claim 2, wherein said diffractor comprises a prism.

4. The apparatus according to claim 2, wherein said diffractor comprises a grating.

5. The apparatus according to claim 1, wherein said beam splitter is of a type which divides optical energy of an incoming light beam such that the area of coverage of said reference light beam includes the entirety of the subject of interest, and said reference light beam accounts for less than all of the available optical energy of an incoming light beam, and the area of coverage of said subject light beam includes the entirety of the subject of interest, and said subject light beam accounts for less than all of the available optical energy of an incoming light beam.

6. The apparatus according to claim 1, wherein said beam restrictor comprises a slit device.

7. The apparatus according to claim 1, wherein said beam splitter comprises a reflector, serves as said beam restrictor, and divides optical energy of an incoming light beam such that the area of coverage of said reference light beam excludes the area of coverage of said subject light beam, and said reference light beam accounts for all of the available optical energy from the area of coverage of said reference light beam and none of the available optical energy from the area of coverage of said subject light beam, and the area of coverage of said subject light beam excludes the area of coverage of said reference light beam, and said subject light beam accounts for all of the available optical energy from the area of coverage of said subject light beam and none of the available optical energy from the area of coverage of said reference light beam.

8. The apparatus according to claim 1, wherein said beam splitter comprises a reflector which is partially reflective and partially transmissive, and also serves as said beam restrictor.

9. The apparatus according to claim 1, further comprising a mobile platform having a source of propulsive power, wherein said mobile platform is disposed to hold said focusing device in image capture relation to the subject of interest, and wherein said source of propulsive power is disposed to move said mobile platform along the subject of interest.

10. The apparatus according to claim 9, wherein said mobile platform is a miniature aircraft.

11. The apparatus according to claim 1, further comprising digital memory operatively connected to at least one of said first digital image recorder and said second digital image recorder, and wherein said digital memory is located remotely therefrom, and a data link disposed to link at least one of said first digital image recorder and said second digital image recorder to said digital memory.

12. A method of providing two dimensional images of a subject of interest from line scan images of said subject of interest taken sequentially from a mobile platform, comprising the steps of:

focusing incoming light beams emanating from a subject of interest;

dividing optical energy of each of said incoming light beams, thereby forming a reference light beam for each primary image, and a subject light beam for each primary image;

periodically recording a two-dimensional primary image of successively adjacent portions of the subject of interest, each of said two-dimensional primary images having thereon at least three recognizable geometric reference points;

recording a two dimensional reference image obtained from the reference light beam corresponding to each of said recorded primary images;

restricting each subject light beam to dimensions and configurations generating a single dimensional subject image from each of said primary images, wherein each of said single dimensional subject images corresponds in area of coverage to a respective one of an associated one of said reference images; and recording each of said single dimensional subject images in a manner such that each of said subject images is linked to said associated one of said reference images.

13. The method according to claim 12, comprising the further step of diffracting the subject light beam into multispectral images after performing said step of restricting each of said subject light beams, and prior to performing said step of recording each of said single dimensional subject images.

14. The method according to claim 12, comprising the further steps of:

manipulating data corresponding to at least one of the subject images to position the single dimensional subject images within an array wherein each of said single dimensional subject images abuts at least one other of said single dimensional subject images, and is positioned within the array according to its corresponding location relative to the geometric reference points of the reference image; and generating integrated data corresponding to a reconstituted two dimensional subject image from the array.

15. The method according to claim 12, comprising the further step of: providing a mobile platform having image capture apparatus, and wherein said step of recording a two dimensional reference image obtained from the reference light beam corresponding to each primary image in a digital data memory device includes the further step of carrying the digital data memory device aboard the mobile platform, and said step of recording each single dimensional subject image in the digital data memory device comprises the further step of carrying the digital data memory device aboard the mobile platform.

16. The method according to claim 15, wherein said step of providing a mobile platform having image capture apparatus comprises the further step of providing a miniature aircraft as the mobile platform.

17. The method according to claim 12, wherein at least one of said periodically recording a primary image, recording a reference image, and recording each of said single dimensional subject images comprises recording into a digital memory device, and comprising the further steps of locating the digital memory device remotely from the mobile platform; and transmitting data from the mobile platform to the digital memory device by a data link.

18. A method of registering a single dimensional image with a two dimensional reference image, comprising the steps of:

splitting optical energy of a light beam emanating from a subject of interest into a reference light beam for generating a reference image having thereon at least three recognizable geometric reference points contained within the area of coverage of the reference image, and a subject light beam;

recording a two dimensional reference image obtained from the reference light beam in a digital data memory device;

restricting the subject light beam to a single dimensional configuration for generating at least one single dimensional subject image; and recording the at least one single dimensional subject image in the digital data memory device in a manner such that location of the subject image is linked to the geometric reference points of the reference image.

19. The method according to claim 18, comprising the further steps of:

diffracting the subject light beam prior to recording the single dimensional subject image; and generating a plurality of single dimensional images each of one spectral band;

and wherein said step of recording the at least one single dimensional subject image in the digital data memory device comprises the further step of recording the plurality of single dimensional images.

20. The method according to claim 18, comprising the further step of:

providing a mobile platform having image capture apparatus, wherein said step of recording a two dimensional reference image obtained from the reference light beam in the digital data memory device comprises the further step of carrying the digital data memory device aboard the mobile platform, and said step of recording the at least one single dimensional subject image in the digital data memory device comprises the further step of carrying the digital data memory device aboard the mobile platform.

21. The method according to claim 20, wherein said step of providing a mobile platform having image capture apparatus comprises the further step of providing a miniature aircraft as the mobile platform.

22. An apparatus for registering a single dimensional image with a two dimensional reference image, comprising:

a) means for splitting optical energy of a light beam emanating from a subject of interest into a reference light beam and a subject light beam;

b) means for receiving said reference light beam, operatively connected to said means for splitting, and adapted for recording a two dimensional reference image obtained from said reference light beam, said reference image comprising at least three recognizable geometric reference points;

c) means for restricting said subject light beam to a single dimensional configuration operatively connected to said means for splitting, said means for restricting being adapted for generating at least one single dimensional subject image from said subject light beam; and d) means for recording said at least one of said single dimensional subject images such that a location of said at least one of said subject images is linked to at least one of said geometric reference points of said reference image.

23. The apparatus for registering a single dimensional image with a two dimensional reference image according to claim 22, further comprising:

e) means for focusing said light beam emanating from said subject of interest disposed between said subject of interest and said means for splitting.

* * * * *